United States Patent
Yang

(10) Patent No.: US 11,187,169 B1
(45) Date of Patent: Nov. 30, 2021

(54) METHOD OF CONTROLLING VEHICLE ENGINE SYSTEM

(71) Applicants: HYUNDAI MOTOR COMPANY, Seoul (KR); KIA MOTORS CORPORATION, Seoul (KR)

(72) Inventor: Il Suk Yang, Hwaseong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 17/079,060

(22) Filed: Oct. 23, 2020

(30) Foreign Application Priority Data

Jul. 22, 2020 (KR) .......... 10-2020-0091118

(51) Int. Cl.
- F02D 41/00 (2006.01)
- F02D 41/06 (2006.01)
- F02M 26/22 (2016.01)

(52) U.S. Cl.
CPC ....... F02D 41/0077 (2013.01); F02D 41/068 (2013.01); F02M 26/22 (2016.02); F02D 2200/602 (2013.01)

(58) Field of Classification Search
CPC ............... F02D 41/0077; F02D 41/068; F02D 2200/602; F02M 26/22
See application file for complete search history.

(56) References Cited

U.S. PATENT DOCUMENTS 5,239,960 A * 8/1993 Sasaki ............... F02M 26/35
123/308

| 2009/0188475 | A1* | 7/2009 | Ueda | F02M 26/25 |
| | | | | 123/568.12 |
| 2014/0318513 | A1* | 10/2014 | Kovac | F02M 26/24 |
| | | | | 123/568.12 |
| 2015/0121847 | A1* | 5/2015 | Pursifull | F02D 41/0077 |
| | | | | 60/274 |
| 2015/0121848 | A1* | 5/2015 | Pursifull | F01N 5/02 |
| | | | | 60/274 |
| 2015/0176538 | A1* | 6/2015 | Baasch | F02M 26/26 |
| | | | | 123/568.12 |
| 2016/0265485 | A1* | 9/2016 | Massard | F02D 41/005 |
| 2019/0107066 | A1* | 4/2019 | Kurtz | F01N 3/106 |

FOREIGN PATENT DOCUMENTS

| JP | 2004124744 A | * | 4/2004 |
| KR | 10-2017-0035445 A | | 3/2017 |

* cited by examiner

Primary Examiner — Joseph J Dallo
(74) Attorney, Agent, or Firm — Lempia Summerfield Katz LLC

(57) ABSTRACT

A method of controlling a vehicle engine system is proposed. In the method, a controller selectively enables: an exhaust heat recovery mode where, with a bypass valve, exhaust gas bypassing an EGR cooler is prevented from joining and an EGR valve is closed; an EGR mode where, with the bypass valve, surplus exhaust gas, flowing through the EGR cooler is prevented from joining and the degree of opening of the EGR valve is adjusted; a complex mode where, with the bypass valve, a ratio between amounts of the surplus exhaust gas flowing through the EGR cooler and the exhaust gas bypassing the EGR cooler is adjusted and the degree of opening of the EGR valve is adjusted; and a high output mode where, with the bypass valve, the surplus exhaust gas flowing through the EGR cooler is prevented from joining to be discharged and the EGR valve is closed.

9 Claims, 10 Drawing Sheets

METHOD OF CONTROLLING VEHICLE ENGINE SYSTEM

CROSS REFERENCE TO RELATED APPLICATION

This application claims priority to and the benefit of Korean Patent Application No. 10-2020-0091118, filed on Jul. 22, 2020, the entire contents of which are incorporated herein by reference.

FIELD

The present disclosure relates to a vehicle engine system and, more particularly, to an exhaust gas recirculation (EGR) technology for recovering exhaust heat produced in an engine.

BACKGROUND

The statements in this section merely provide background information related to the present disclosure and may not constitute prior art.

Various methods have been developed to use the heat in exhaust gas produced from an engine. Among them, there is a method of warming up the engine more quickly when starting the engine in a cold state by increasing the temperature of coolant in the engine with the heat of exhaust gas.

However, in case of a hybrid vehicle, when a heater is driven to increase an air temperature inside the hybrid vehicle, the temperature of the heater has to be increased while operating the engine at as low a speed as possible. Therefore, in some cases, the primary purpose of recovering the exhaust heat produced in the engine may be targeted to increase the temperature of the heater.

An EGR apparatus is an apparatus that recirculates a portion of exhaust gas back into a combustion chamber through an intake system for an engine. The EGR apparatus in a gasoline engine is employed to improve fuel efficiency.

The foregoing is intended merely to aid in the understanding of the background of the present disclosure, and is not intended to mean that the present disclosure falls within the purview of the related art that is already known to those skilled in the art.

SUMMARY

The present disclosure provides a method of controlling a vehicle engine system, which is capable of effectively performing a function of recovering exhaust heat produced in an engine and an EGR cooler function of an EGR apparatus with a simpler and more compact configuration. The method reduces the number of components and man-hours for assembling the components, thereby reducing the manufacturing cost. Furthermore, the method improves fuel efficiency of a vehicle and reduces harmful substances from an internal combustion engine thereof.

According to an aspect of the present disclosure, a method of controlling an engine system of a vehicle is provided. In particular, the engine system is configured to enable exhaust gas from an engine to flow separately through an EGR cooler and a bypass pipe, and includes: a bypass valve having a valve flap that relatively adjusts the degree of opening of a first port provided to regulate the flow of the exhaust gas through the bypass pipe, and the degree of opening of a second port provided to regulate the flow of the exhaust gas through the EGR cooler, and an EGR valve through which a portion of the exhaust gas flowing through the EGR cooler is supplied to the engine. The engine system is configured to heat a heater by a coolant from the EGR cooler. In one form, the method includes: determining, by a controller, whether or not a high output from the engine is required based on an amount of operation of an acceleration pedal; and controlling, by the controller, the valve flap of the bypass valve to fully open the first port and block the second port and closing the EGR valve, and thus discharging the exhaust gas only through the bypass pipe, when the high output is required.

In the method, in the determining of whether or not a high output is required, when the amount of the operation of the acceleration pedal indicates a WOT state or when the amount of the operation of the acceleration pedal has a predetermined reference value or more, it may be determined that the high output is required.

In the method, when the high output of the engine is not required and the temperature of an engine coolant is lower than a predetermined reference temperature, the EGR valve may be closed.

In the method, in a state where the EGR valve is closed, when the heater of the vehicle is turned on, the first port may be fully closed and the second port may be fully opened with the valve flap of the bypass valve, and thus the exhaust gas may be discharged only through the EGR cooler.

In the method, when the high output of the engine is not required, the temperature of an engine coolant is equal to or higher than a predetermined reference temperature, and the heater of the vehicle is turned off, the second port may be fully closed with the valve flap of the bypass valve.

In the method, in a state where the second port is fully closed with the valve flap of the bypass valve, when the engine operates in a range where EGR is required, the degree of opening of the EGR valve may be adjusted according to EGR requirement at that time.

In the method, when the high output of the engine is not required, the temperature of an engine coolant is equal to or higher than a predetermined reference temperature, and the heater of the vehicle is turned on until a target temperature of the heater is reached, a rotation angle of the valve flap of the bypass valve may be adjusted while maintaining a state where the first port and the second port are both opened.

In the method, when the high output of the engine is not required, the temperature of the engine coolant is equal to or higher than the predetermined reference temperature, and the engine operates in a range where EGR is required until a target EGR for the engine is achieved, the rotation angle of the valve flap of the bypass valve may be adjusted while maintaining the state where the first port and the second port are both opened.

In the method, when the high output of the engine is not required, the temperature of the engine coolant is equal to or higher than the predetermined reference temperature, the heater of the vehicle is turned on, and the engine operates in the range where EGR is required, comparing, by the controller, a first rotation angle of the valve flap at which the target temperature of the heater is reached with a second rotation angle of the valve flap at which the target EGR for the engine is achieved; determining, by the controller, which rotation angle of the valve flap, among the first and second rotation angles of the valve flap, allows a larger amount of the exhaust gas to flow through the EGR cooler; and adjusting, by the controller, the valve flap with the determined rotation angle of the valve flap, among the first and second rotation angles of the valve flap.

According to the present disclosure, a hybrid vehicle engine system includes an EGR cooler assembly capable of concurrently performing a function of recovering exhaust heat produced in an engine and a function of an EGR cooler of an EGR apparatus and a bypass valve capable of adjusting an amount of exhaust heat flowing through or bypassing the EGR cooler. This hybrid vehicle engine system can be effectively controlled, thereby improving fuel efficiency of a vehicle and reducing harmful substances from an internal combustion engine thereof.

In addition, according to the present disclosure, when a heater operates, the EGR cooler recovers the exhaust heat produced in the engine, and the recovered heat heats the heater. This recovering of the heat can improve a heating function of the heater, can reduce the number of times that the engine is driven for heating and the time for heating, and can improve the fuel efficiency of the vehicle.

In addition, according to the present disclosure, in a case where a differential pressure desired for EGR gas to flow is insufficient, a pressure at a point positioned more upstream than the EGR cooler can be increased by operating the bypass valve. Thus, the smooth supplying of the EGR gas can improve the fuel efficiency of the vehicle and can eliminate the need to employ a differential pressure valve for forming the differential pressure, thereby reducing the number of components and the manufacturing cost.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
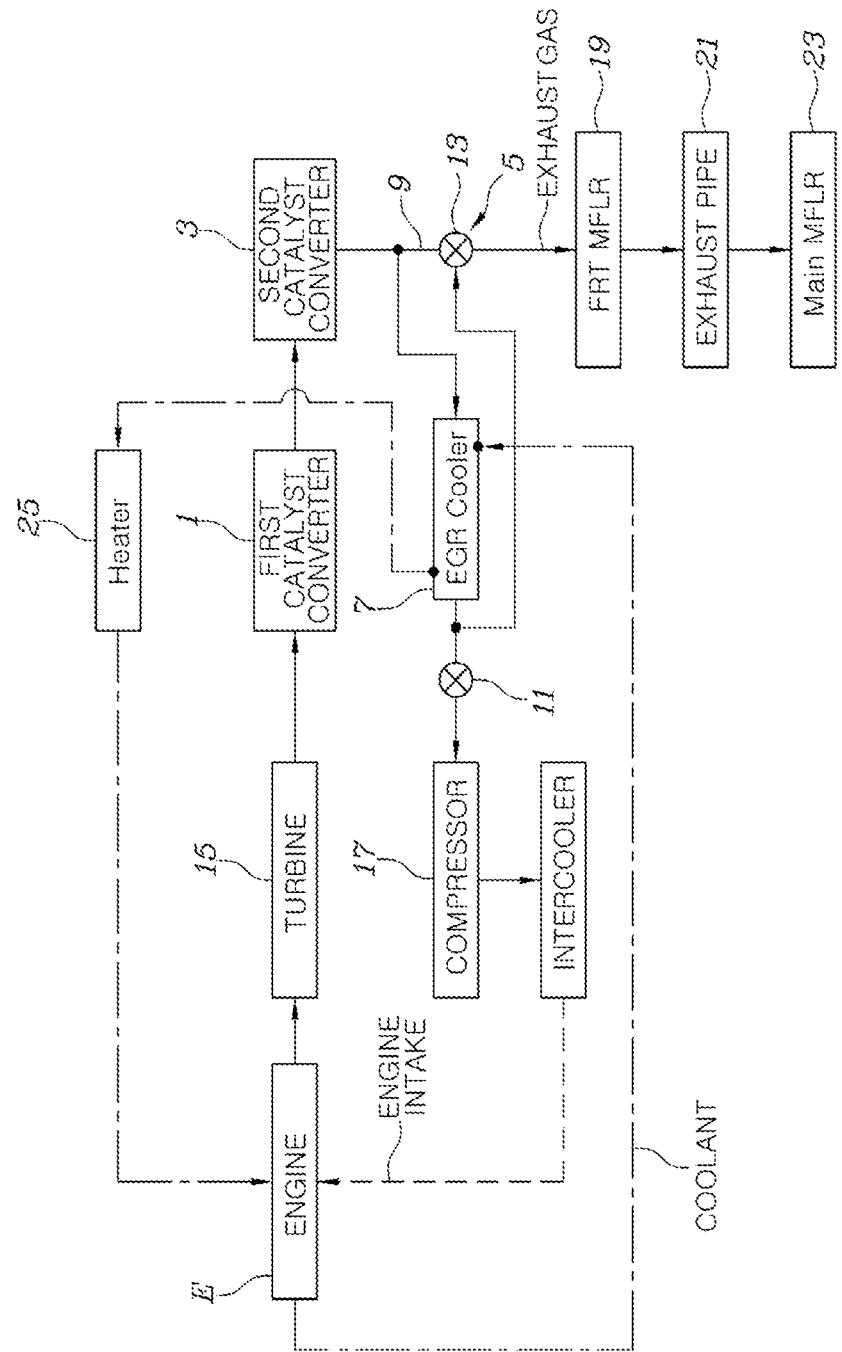
FIG. 1 is a diagram illustrating a configuration of a hybrid vehicle engine system in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a method of controlling a vehicle engine system according to exemplary forms of the present disclosure will be described in detail with reference to the accompanying drawings.

With reference to FIGS. 1 to 5, a hybrid vehicle engine system to which exemplary forms of the present disclosure apply includes: a first catalytic converter 1, a second catalytic converter 3, an EGR cooler 7, a bypass pipe 9, an EGR valve 11, and a bypass valve 13. The first catalytic converter 1 and the second catalytic converter 3 are sequentially installed adjacent to each other toward an exhaust system for an engine E. The EGR cooler 7 and the bypass pipe 9 are parallelly installed between the second catalytic converter 3 and a flow-joining unit 5 positioned more downstream than the second catalytic converter 3, in such a manner that exhaust gas flows separately through each of the EGR cooler 7 and the bypass pipe 9. The EGR valve 11 is installed to adjust an amount of the exhaust gas that flows through the EGR cooler 7 and then flows separately toward an intake system for the engine E. The bypass valve 13 is installed to select one of a state where surplus exhaust gas that flows through the EGR cooler 7 and then is not allowed to flow toward the engine E and the exhaust gas that flows through the bypass pipe 9 are allowed to join together into the flow-joining unit 5, a state where the exhaust gas that flows through the EGR cooler 7 is prevented from flowing into the flow-joining unit 5, and a state where the exhaust gas that flows through the bypass pipe 9 is prevented from flowing into the flow-joining unit 5.

That is, the hybrid vehicle engine system includes the EGR cooler 7, the EGR valve 11, and the bypass valve 13. The EGR cooler 7 cools the exhaust gas at a point positioned more downstream than the catalytic converter. The EGR valve 11 adjusts an amount of the cooled exhaust gas to be supplied to the intake system for the engine E. The bypass valve 13 determines whether or not the surplus exhaust gas that flows through the EGR cooler 7 and is then to be discharged without being supplied to the engine E and the exhaust gas that bypasses the EGR cooler 7 and is then to be discharged are allowed to join together, and adjusts a ratio between amounts of the surplus exhaust gas flowing through the EGR cooler 7 and the exhaust gas bypassing the EGR cooler 7 that join together to be discharged.

The first catalytic converter 1 is connected to the exhaust system for the engine E through a turbine 15 of a turbocharger. The EGR valve 11 is installed to supply the exhaust gas toward the intake system for the engine E through a compressor 17 of the turbocharger.

That is, the exhaust gas flowing from the engine E drives the turbine 15 of the turbocharger and then flows sequentially through the first catalytic converter 1 and the second catalytic converter 3, thereby filtering out harmful substances from the exhaust gas flowing from the engine E. Thereafter, some of the purified exhaust gas is cooled through the EGR cooler 7, then flows through the EGR valve 11, and last is enabled by the compressor 17 to flow toward the intake system for the engine E. Thus, the exhaust gas is recirculated back into a combustion chamber.

Of course, the surplus exhaust gas that flows through the EGR cooler 7 but does not flow through the EGR valve 11 is allowed to join into the flow-joining unit 5, depending on a state of the bypass valve 13, and then is discharged to the atmosphere through an exhaust-related component.

Figure 2:
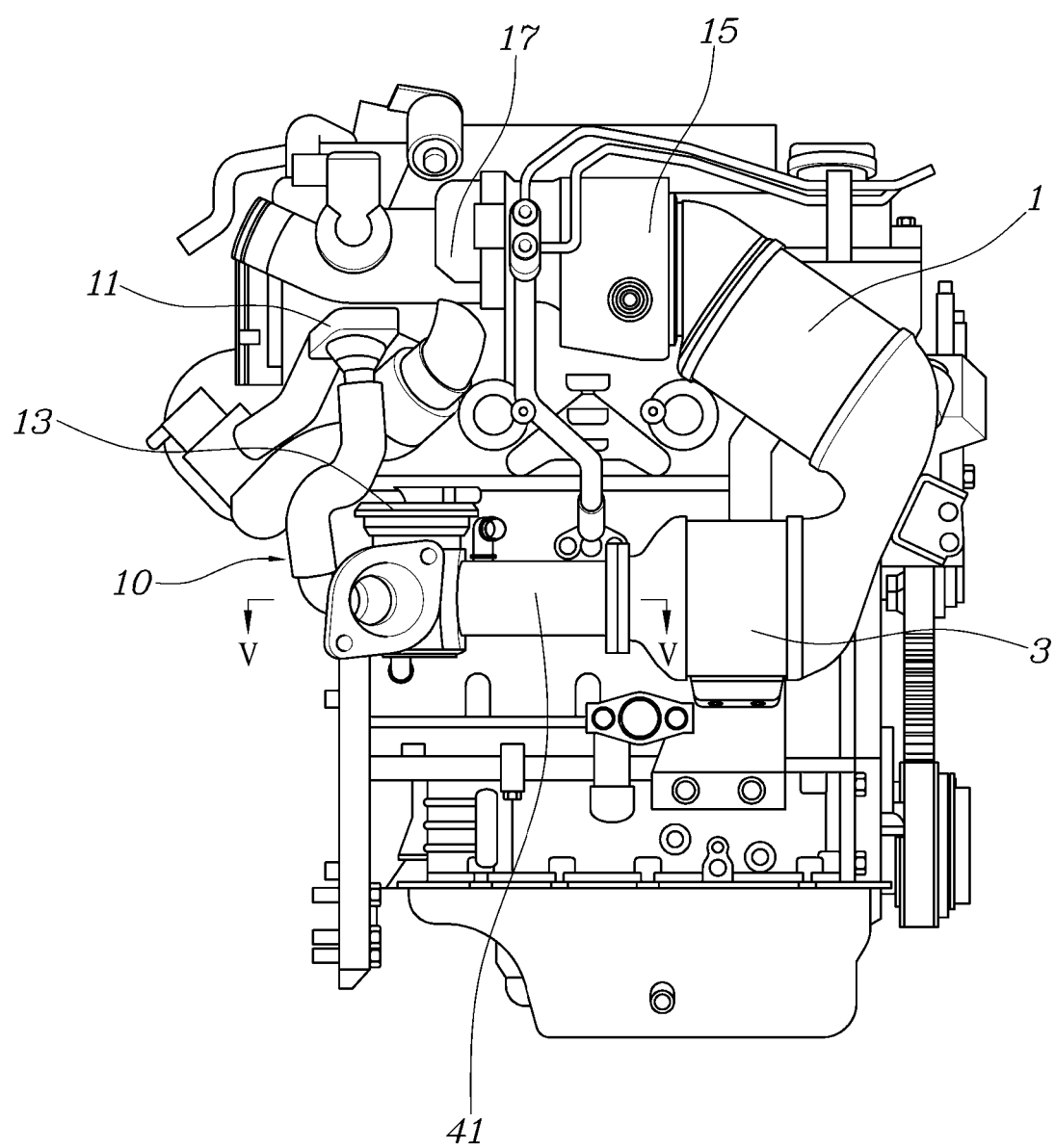
FIG. 2 is a diagram illustrating a main portion of the hybrid vehicle engine system in FIG. 1.
Figure 3:
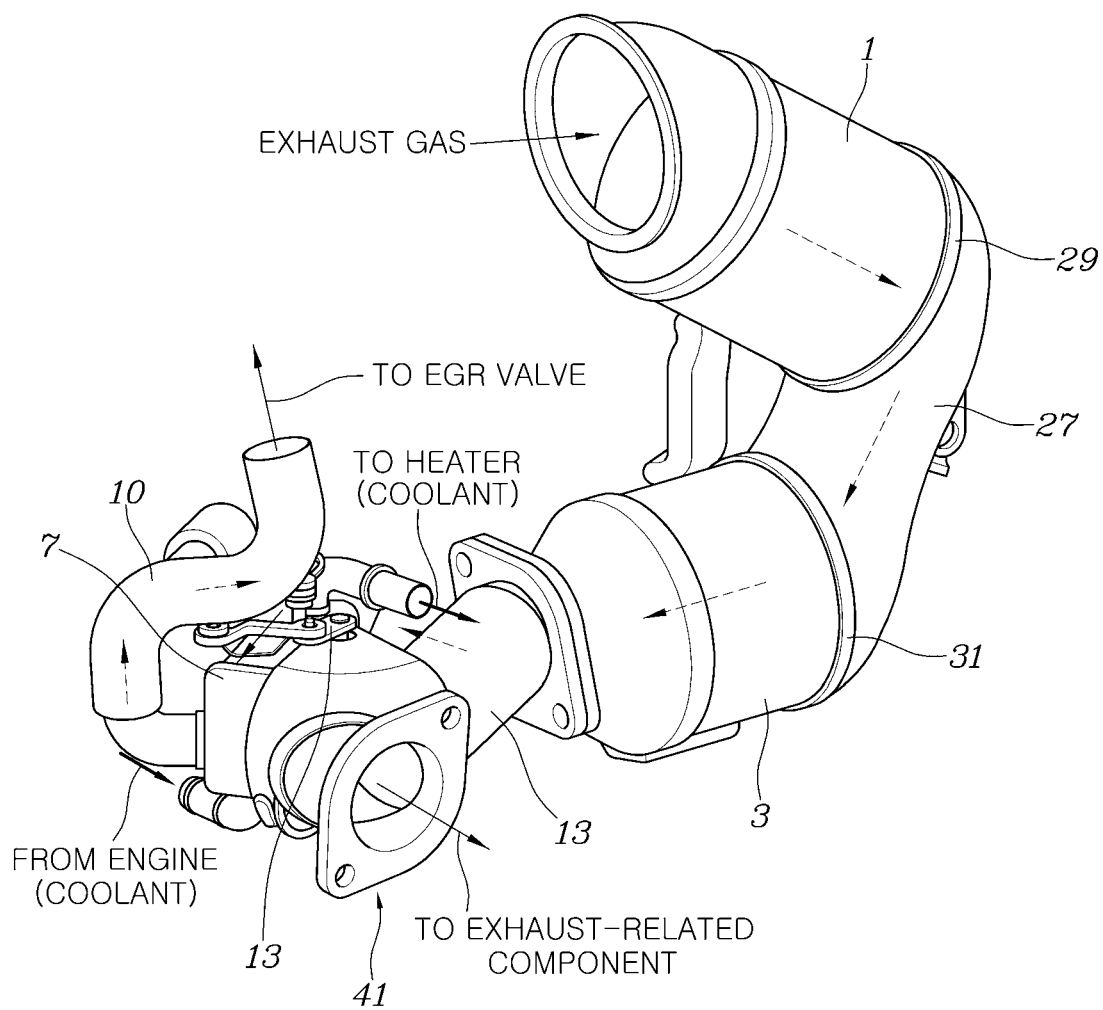
FIG. 3 is a perspective view illustrating the main portion in FIG. 2.
Figure 4:
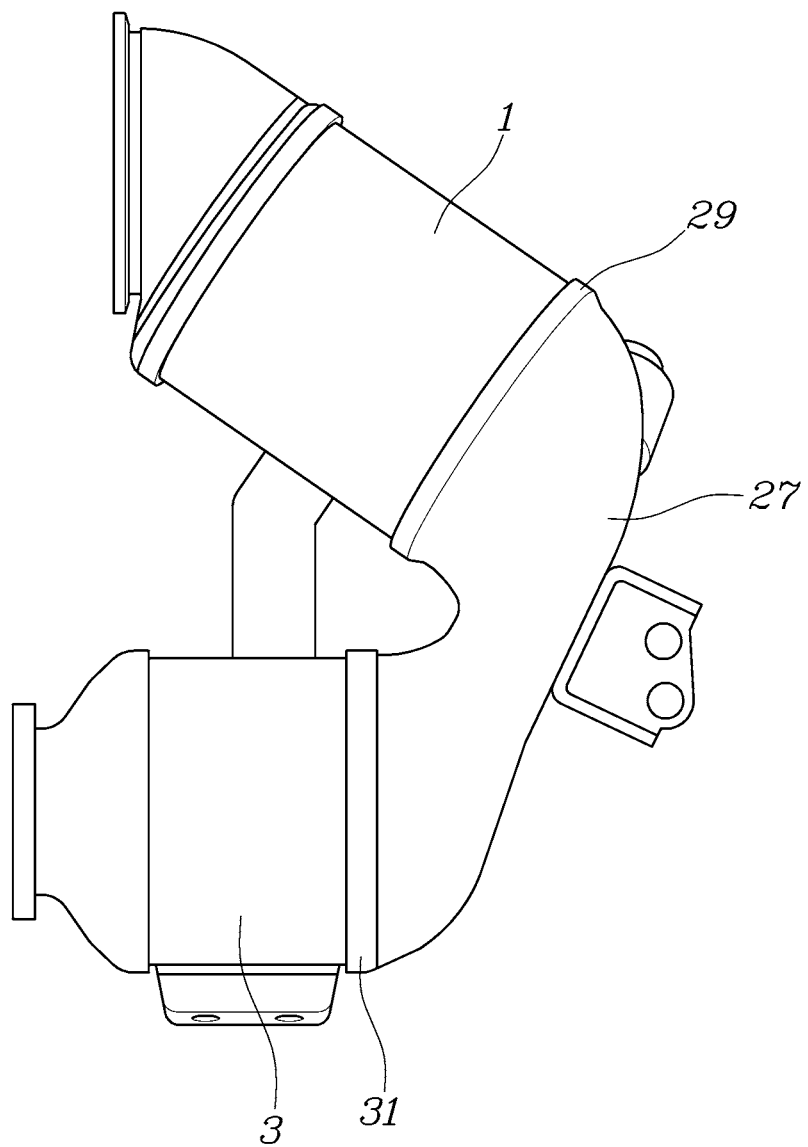
FIG. 4 is a diagram illustrating a structure for connecting a first catalytic converter and a second catalytic converter in FIG. 2.
Figure 5:
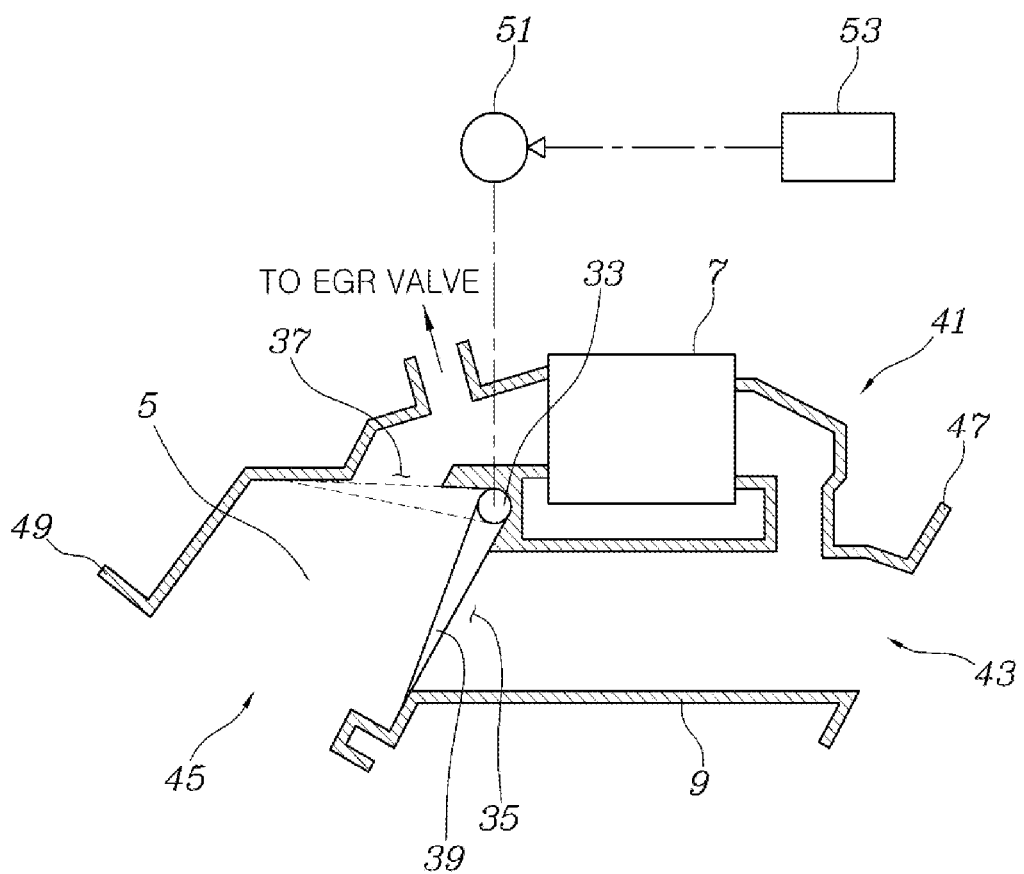
FIG. 5 is a cross-sectional view taken along line V-V on an EGR cooler assembly in FIG. 2.

For reference, the exhaust gas (EGR gas) that flows through the EGR cooler 7 in FIG. 2 is supplied to the EGR valve 11 through an EGR hose 10.

In addition, the exhaust gas that flows through the first catalytic converter 1 and the second catalytic converter 3 flows through the bypass pipe 9 instead of the EGR cooler 7 is also allowed to join into the flow-joining unit 5, depending on the state of the bypass valve 13, and then is discharged to the atmosphere through the exhaust-related component.

For reference, the exhaust-related component refers to a component that is normally desired for a vehicle to discharge exhaust gas from an engine to the atmosphere but is not mentioned as being an essential component according to the present disclosure. The exhaust-related components include a muffler, an exhaust pipe, and the like. In FIG. 1, a front muffler 19, an exhaust pipe 21, and a main muffler 23 are illustrated as the exhaust-related components.

Referring to FIG. 1, the exhaust gas flows from an exhaust manifold of the engine E sequentially through the turbine 15 of the turbocharger, the first catalytic converter 1, the second catalytic converter 3, the bypass pipe 9, the EGR cooler 7, the flow-joining unit 5, and the exhaust-related components, and is then discharged to the atmosphere.

In another form, the first catalytic converter 1 may be configured to connect directly to the exhaust manifold in a natural aspirated engine that is not equipped with a turbocharger.

The EGR cooler 7 is installed in such a manner that the EGR cooler 7 exchanges heat with a coolant supplied from the engine E and that the heated coolant is then recirculated back into the engine E through a heater 25. Thus, the heat, which is recovered from the exhaust gas through the EGR cooler 7, is supplied to the heater 25.

That is, in the hybrid vehicle, with this arrangement of coolant flow paths, thermal energy carried by the exhaust gas from the engine E is recovered, and thus the temperature of the heater 25 is increased earlier and more easily. Accordingly, the user's demand on heating can be satisfied easily and effectively. At the same time, the demand on driving of the engine E can be minimized. As a result, an improvement in a heating function of the vehicle and an improvement in fuel efficiency can be both achieved.

In the related art, an apparatus for recovering exhaust heat produced in the engine E is separately employed for the same purpose. However, in the hybrid vehicle engine system illustrated in FIGS. 1 and 2, the EGR cooler 7 that has to be mounted for improving the fuel efficiency of the engine E, as described above, serves also as the apparatus for recovering the exhaust heat produced in the engine E. Thus, the number of components and man-hours for assembling the components, which are required for manufacturing the vehicle, can be additionally reduced.

In addition, the EGR cooler 7 that also performs a function of recovering the exhaust heat produced in the engine E is positioned closer to the engine E than the apparatus in the related for recovering the exhaust heat produced in the engine E. Thus, a loss of the exhaust heat can be further reduced.

In addition, a path along which an engine coolant that is heated by the exhaust gas while flowing through the EGR cooler 7 is supplied to the heater 25 can be configured to be shorter than that in the related art. Thus, a loss of heat carried by the coolant can be greatly reduced, thereby contributing an improvement in heating performance of the vehicle.

Heating performance of the heater 25 is improved due to the reduction in the loss of the exhaust heat produced in the engine E and the reduction in the loss of the heat carried by the coolant. This improvement reduces the number of times that the engine E is driven for heating in an EV mode in the hybrid vehicle and the time for heating. As a result, the fuel efficiency of the vehicle is improved.

The first catalytic converter 1 is installed on the turbine 15 in a manner that is inclined downward at an acute angle with respect to the horizontal. The second catalytic converter 3 is connected to the first catalytic converter 1 and the connection duct 27 in a manner that is inclined upward at an acute angle with respect to the horizontal. Thus, the first catalytic converter 1 and the second catalytic converter 3 are sequentially arranged in the upward and downward direction toward the exhaust system for the engine E.

There are a warm-up catalytic convert (WCC) and an under-floor catalytic converter (UCC) in the related art. The first catalytic converter 1 and the second catalytic converter 3, both positioned adjacent to the engine E, are the WCCs. Therefore, when starting the engine E in a cold state, it is possible that a light-off temperature (LOT) is reached quickly due to the heat produced in the engine E. It is also possible that the use of a precious metal as a catalyst decreases.

The connection duct 27 is shaped to connect the first catalytic converter 1 and the second catalytic converter 3 in such a manner that a direction in which the exhaust gas flows through the first catalytic converter 1 and a direction in which the exhaust flows through the second catalytic converter 3 make an acute angle with respect to each other. Thus, the first catalytic converter 1 and the second catalytic converter 3 are compactly arranged close to the exhaust system for the engine E.

The connection duct 27 has a first end portion 29 connected to the first catalytic converter 1 and a second end portion 31 connected to a second catalytic converter 3. The first end portion 29 and the second end portion 31 have respective circular cross sections, thereby being easily combined with the catalytic converts, respectively.

In one form, a length between the first and second end portions 29 and 31 of the connection duct 27 is 1.5 times or less than a length of the first catalytic converter 1. The reason for this is that, as described above, the first catalytic converter 1 and the second catalytic converter 3 have to be compactly arranged in the upward and downward direction in a manner that is adjacent to the exhaust system for the engine E.

In another form, the connection duct 27 has a main body with a circular cross section or a rectangular cross section between the first and second end portion 29 and 31 thereof.

The reason for this is that, as illustrated in FIG. 2, the first catalytic converter 1 and the second catalytic converter 3 have to be compactly arranged in the upward and downward direction toward the exhaust system for the engine E and that a flow of the exhaust gas from the first catalytic converter 1 to the second catalytic converter 3 has to be optimized.

The bypass valve 13 includes a valve flap 39. The valve flap 39 has a rotation shaft 33 that is positioned more upstream than the flow-joining unit 5. The valve flap 39 is installed in a manner that is rotatable by the rotation shaft 33.

According to a rotation angle of the rotation shaft 33, a first surface of the valve flap 39 closes a first port 35 through which the exhaust gas flowing through the bypass pipe 9 flows toward the flow-joining unit 5, and a second surface thereof closes a second port 37 through which the exhaust gas flowing through the EGR cooler 7 flows toward the flow-joining unit 5.

The bypass valve 13 is configured in such a manner that the valve flap 39 is rotated between the first port 35 and the second port 37. This rotation relatively changes resistance to a flow of the exhaust gas from the first port 35 into the flow-joining unit 5 and resistance to a flow of the exhaust gas from the second port 37 into the flow-joining unit 5.

That is, in a state where the valve flap 39 does not block any one of the first port 35 and the second port 37, the closer the valve flap 39 is rotated to the first port 35, the more the resistance to the flow of the exhaust gas from the first port 35 into the flow-joining unit 5 increases. Thus, the exhaust gas flowing through the EGR cooler 7 into the flow-joining unit 5 increases more in amount than the exhaust gas flowing through the bypass pipe 9 into the flow-joining unit 5. Furthermore, the closer the valve flap 39 is rotated to the second port 37, the more the resistance to the flow of the exhaust gas from the second port 37 into the flow-joining unit 5 increases. Thus, the exhaust gas flowing through the bypass pipe 9 into the flow-joining unit 5 increases more in amount than the exhaust gas flowing through the EGR cooler 7 into the flow-joining unit 5.

Of course, when the valve flap 39 approaches the first port 35 and finally blocks the first port 35, the exhaust gas flows through the EGR cooler 7 and the second port 37 into the flow-joining unit 5 instead of flowing through the bypass pipe 9. When the valve flap 39 approaches the second port 37 and finally blocks the second port 37, the exhaust gas flows only through the bypass pipe 9 into the flow-joining unit 5 instead of flowing through the EGR cooler 7.

On the other hand, the bypass pipe 9, the EGR cooler 7, and the like are integrated into one assembly and are traded and handled as a single component. This single component is defined as an EGR cooler assembly 41. The EGR cooler assembly 41 includes the bypass pipe 9, the EGR cooler 7, and the bypass valve 13. The bypass pipe 9 includes an inlet port 43 and the outlet port 45 for the exhaust gas. The EGR cooler 7 is configured to form an exhaust gas path in parallel with the bypass pipe 9. Along this exhaust gas path, the exhaust gas that separately flows at a point positioned more upstream that the bypass pipe 9 flows through the EGR cooler 7, exchanging heat therewith, and then is supplied to the engine E. However, the surplus exhaust gas, which is not supplied to the engine E, joins into the flow-joining unit 5 positioned more downstream than the bypass pipe 9. The bypass valve 13 selects a state where the exhaust gas that flows through the EGR cooler 7 and then is to join into the flow-joining unit 5 is prevented from flowing into the flow-joining unit 5, or a state where the exhaust gas that flows through the bypass pipe 9 is prevented from joining into the flow-joining unit 5. Furthermore, the bypass valve 13 relatively adjusts an amount of the exhaust gas flowing through the EGR cooler 7 into the flow-joining unit 5 for joining and an amount of the exhaust gas flowing through the bypass pipe 9 into the flow-joining unit 5 for joining.

The bypass valve 13 includes the valve flap 39, the first port 35, and the second port 37. The valve flap 39 has the rotation shaft 33 positioned perpendicular to a flowing direction of the exhaust gas that flows through the bypass pipe 9 into the flow-joining unit 5 and a flowing direction of the exhaust gas that flows through the EGR cooler 7 into the flow-joining unit 5. The first port 35 is blocked by a first surface of the valve flap 39 in such a manner that the exhaust gas is prevented from flowing through the bypass pipe 9 into the flow-joining unit 5. The second port 37 is blocked by the second surface of the valve flap 39 in such a manner that the exhaust gas is prevented from flowing through the EGR cooler 7 into the flow-joining unit 5.

The first port 35 and the second port 37 are formed to make an acute angle with respect to each other in such a manner that the rotation of the valve flap 39 in a range of acute angles that the first port 35 and the second port 37 make with respect to each other opens the first port 35 and the second port 37 or fully closes the first port 35 or the second port 37.

Therefore, the exhaust gas that flows through the first port 35 into the flow-joining unit 5 and the exhaust gas that flows through the second port 37 into the flow-joining unit 5 join together at an acute angle with respect to each other and then flows smoothly into the flow-joining unit 5.

A first flange 47 that is to be combined with an end portion of the catalytic converter is integrally combined with the inlet port 43 of the bypass pipe 9. A second flange 49 that is to be combined with the exhaust-related component is integrally combined with the outlet port 45 of the bypass pipe 9.

Therefore, as illustrated in FIG. 2, according to one form, in order to provide a path for discharging the exhaust gas from the engine E to the atmosphere, the first flange 47 is combined with the second catalytic converter 3, and the second flange 49 is combined with the exhaust-related component.

Of course, it is possible that the first flange 47, for example, is welded on the catalytic converter instead of being provided on the inlet port 43 of the bypass pipe 9. In the same manner, it is also possible that the exhaust-related component, for example, is welded directly on the outlet port 45 of the bypass pipe 9.

For reference, the "catalytic converter" here is not limited to the first catalytic converter 1 or the second catalytic converter 3 according to some forms of the present form and refers to any catalytic converter with which the EGR cooler assembly 41 can be combined.

On the other hand, the bypass valve 13 is installed in such a manner as to be driven by a valve actuator 51.

In one form, a motor-based apparatus that receives an electrical control signal and, with the received electrical control signal, precisely controls the rotation angle of the valve flap 39 is used as the valve actuator 51.

Figure 6:
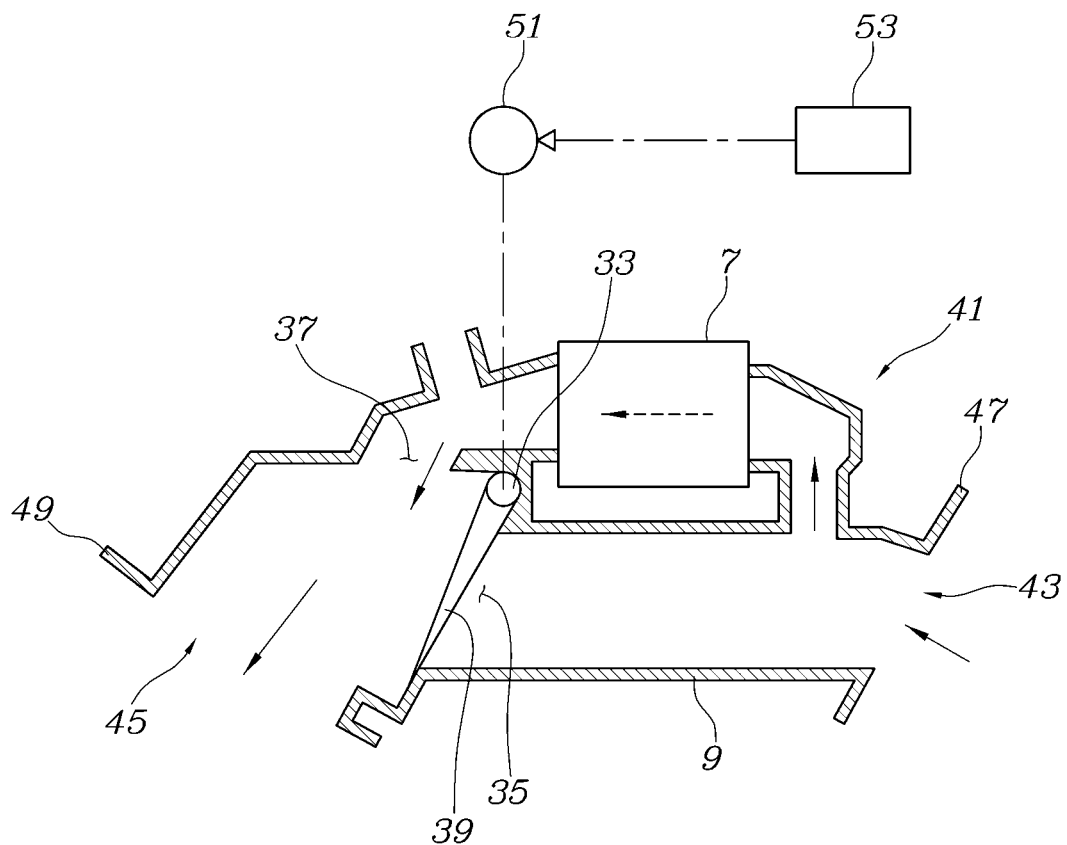
FIG. 6 is a diagram illustrating a flow of exhaust gas in the EGR cooler assembly in an exhaust heat recovery mode in one form of the present disclosure.

A controller 53 that controls the valve actuator 51 enables an exhaust gas recovery mode, an EGR mode, a complex mode, and a high output mode. In the exhaust gas recovery mode, as illustrated in FIG. 6, the valve flap 39 blocks the first port 35, closes the EGR valve 11, and thus all the exhaust gas flows through the EGR cooler 7 into the flow-joining unit 5.

Figure 7:
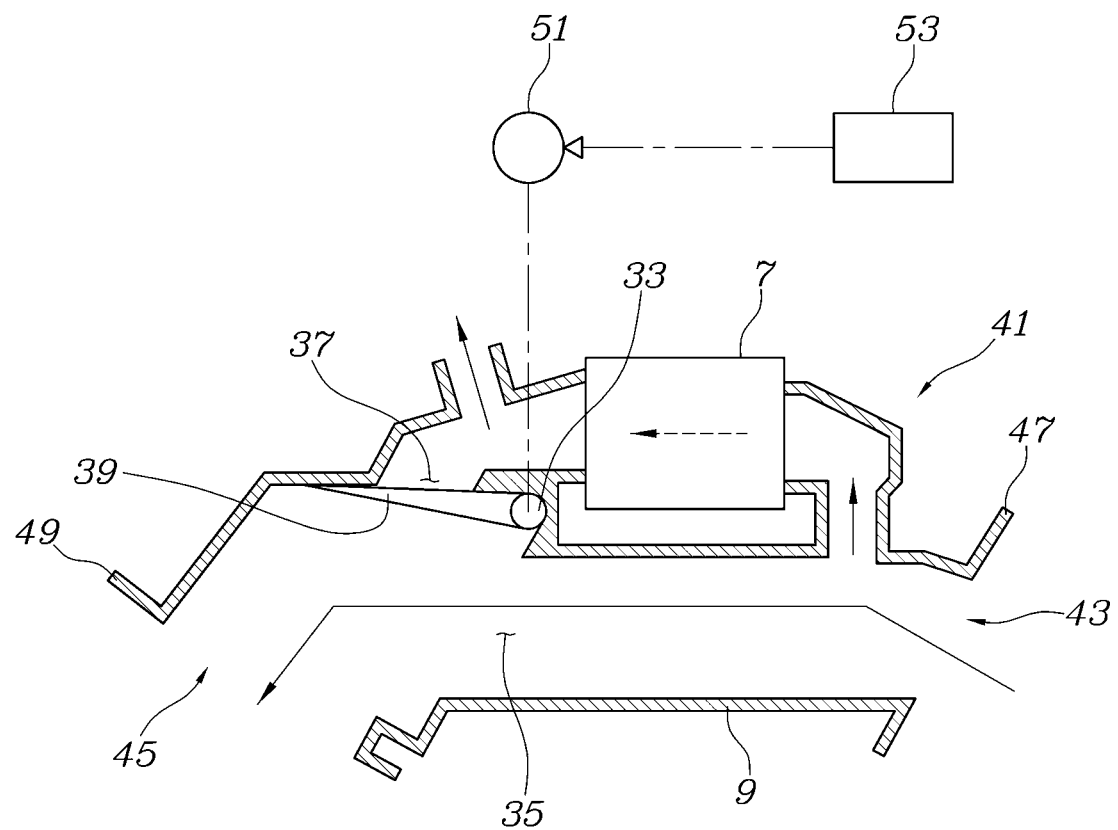
FIG. 7 is a diagram illustrating the flow of exhaust gas in the EGR cooler assembly in an EGR mode in one form of the present disclosure.

In the EGR mode, as illustrated in FIG. 7, the valve flap 39 blocks the second port 37, the degree of opening of the EGR valve 11 is adjusted, and thus EGR is realized while reducing a backpressure exerted on the engine E.

Figure 8:
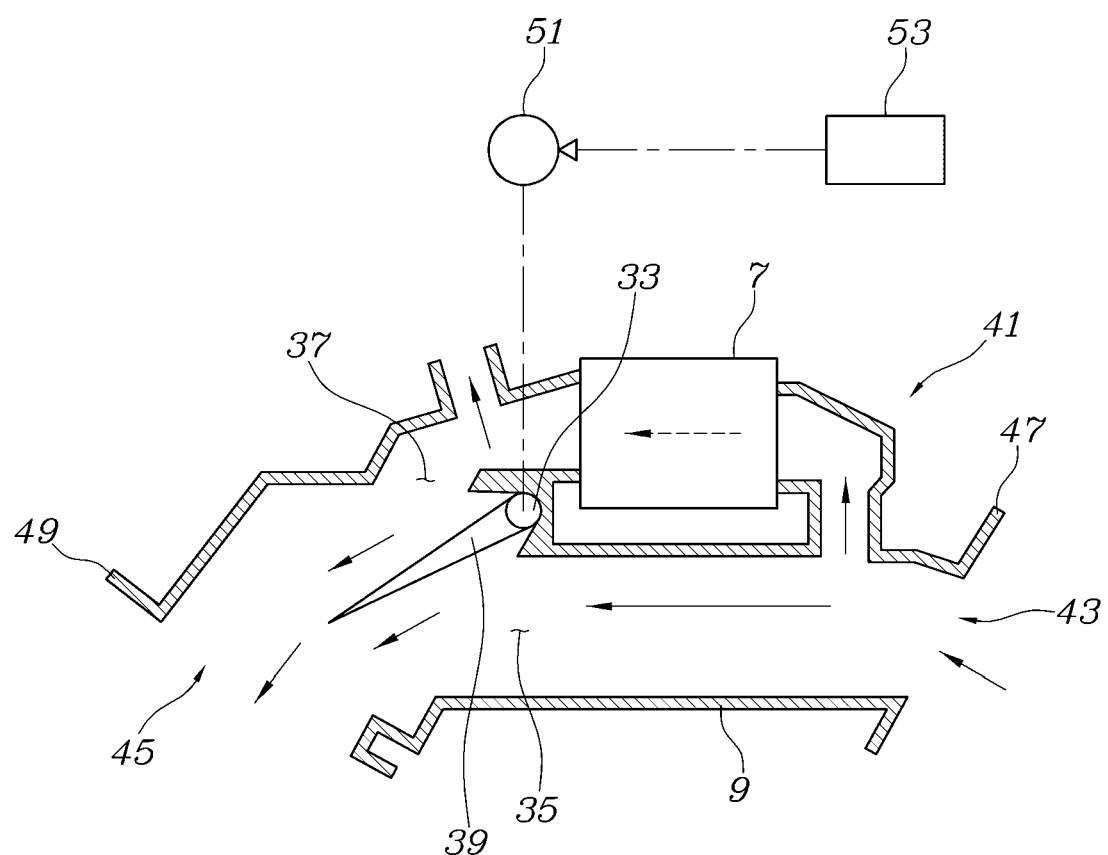
FIG. 8 is a diagram illustrating the flow of exhaust gas in the EGR cooler assembly in a complex mode in one form of the present disclosure.

In the complex mode, as illustrated in FIG. 8, the valve flap 39 is positioned between the first port 35 and the second port 37, the first port 35 and the second port 37 are both in an opened state, and thus, when a differential pressure for EGR is insufficient, an angle of the valve flap 39 is adjusted, thereby increasing an amount of EGR flow.

Figure 9:
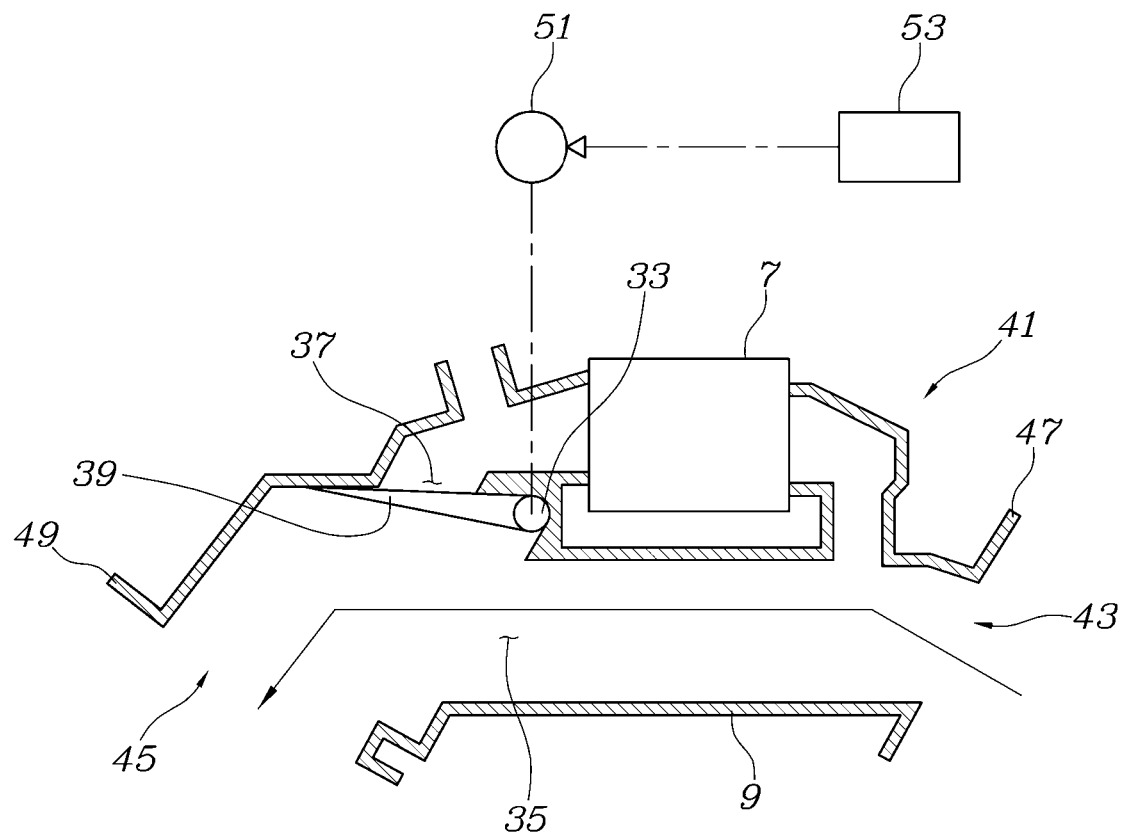
FIG. 9 is a diagram illustrating the flow of exhaust gas in the EGR cooler assembly in a high output mode in one form of the present disclosure.

In the high output mode, as illustrated in FIG. 9, the valve flap 39 blocks the second port 37, the EGR valve 11 is closed, and thus the backpressure exerted on the engine E is minimized, thereby maximizing an output of the engine E.

Figure 10:
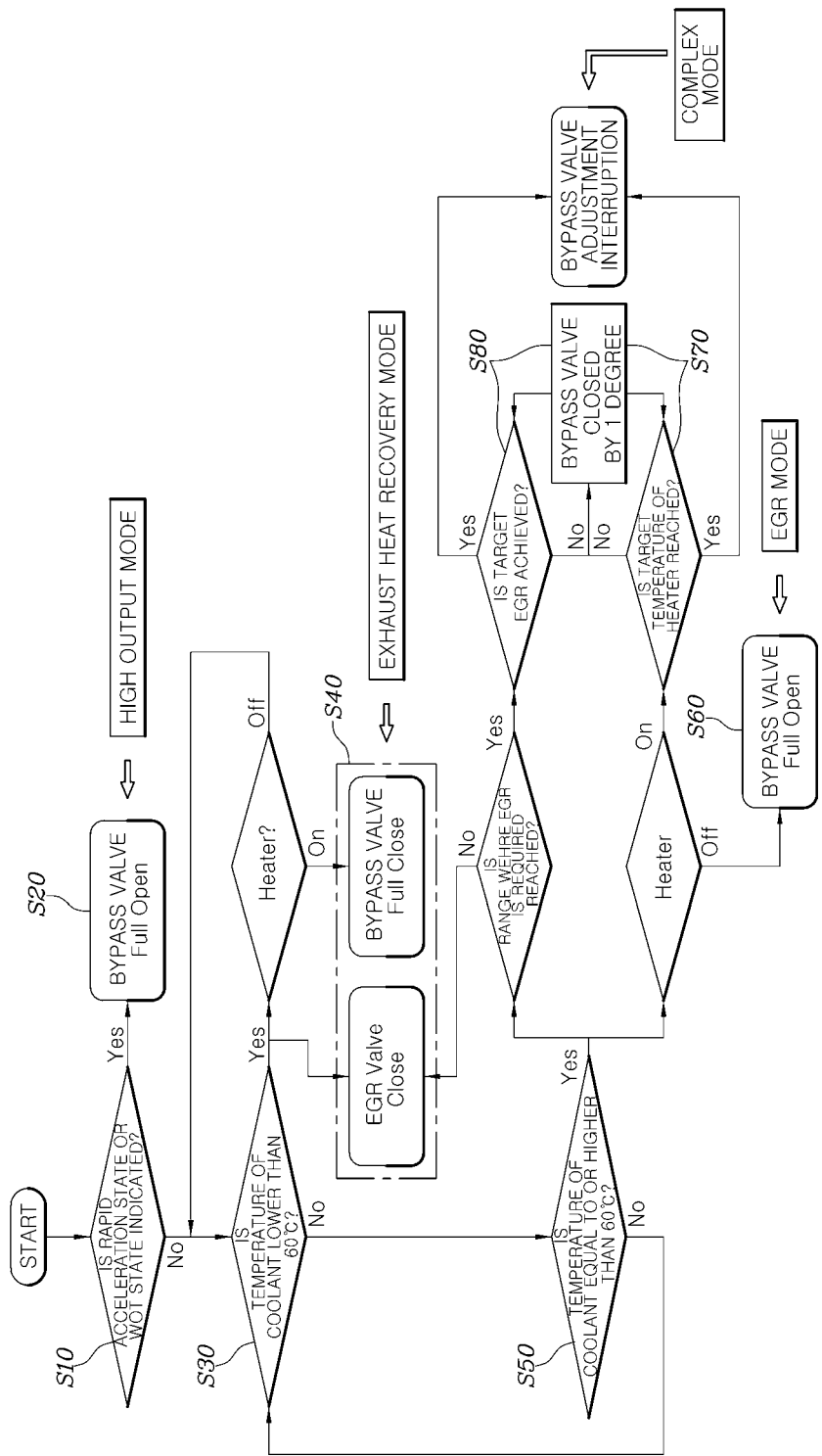
FIG. 10 is a flowchart illustrating a method of controlling the hybrid vehicle engine system according to another form of the present disclosure.

FIG. 10 illustrates a control method of controlling the hybrid vehicle engine system, as described above, according to another form of the present disclosure.

The controller 53 selectively enables the exhaust heat recovery mode, the EGR mode, the complex mode, and the high output mode, according to an amount of operation of an acceleration pedal, the temperature of the engine coolant, whether or not the heater 25 operates, and whether or not a range where EGR is required is reached, in the vehicle.

In the exhaust gas recovery mode, the bypass valve 13 prevents the exhaust gas having bypassed the EGR cooler 7 from joining, and the EGR valve 11 is closed.

In the EGR mode, the bypass valve 13 prevents the surplus exhaust gas flowing through the EGR cooler 7 from joining to be discharged, and the degree of opening of the EGR valve 11 is adjusted.

In the complex mode, a ratio between amounts of the surplus exhaust gas flowing through the EGR cooler 7 and the exhaust gas bypassing the EGR cooler 7 that join to be discharged is adjusted with the bypass valve 13, and the degree of opening of the EGR valve 11 is adjusted.

In the high output mode, the bypass valve 13 prevents the surplus exhaust gas flowing through the EGR cooler 7 from joining to be discharged, and the EGR valve 11 is closed.

The controller 53 performs Step S10 of determining whether or not the amount of the operation of the acceleration pedal indicates a wide-open throttle (WOT) state or a rapid acceleration state of the vehicle, and Step S20 of enabling the high output mode in which all the exhaust gas flowing through the catalytic converter bypasses the EGR cooler 7 and the backpressure exerted on the engine E is minimized, when the amount of the operation of the acceleration pedal indicates the WOT state or the rapid acceleration state.

When the amount of the operation of the acceleration pedal indicates the WOT state or the rapid acceleration state of the vehicle, this means that a situation is reached in which a high output is required by a driver. Therefore, when the amount of the operation of the acceleration pedal indicates the WOT state or has a predetermined reference value or higher, it is determined that the high output is required.

For example, when the amount of the operation of the acceleration pedal that has 70% or more of the reference value is defined as the rapid acceleration state, in a case where the amount of the operation of the acceleration pedal has 70% to 100% (the WOT state) of the reference value, the controller 53 determines that the rapid acceleration state of the vehicle is reached, and enables the high output mode. In the high output mode, the second port 37 is fully closed by the bypass valve 13, the surplus exhaust gas flowing through the EGR cooler 7 is prevented from flowing through the second port 37 and being discharged, the exhaust gas is allowed to flow through the bypass pipe 9 and the first port 35, and the EGR valve 11 is closed.

In the high output mode, as described above, the exhaust gas that flows through the catalytic converter is smoothly discharged through the bypass pipe 9, and thus the backpressure exerted on the engine E is minimized. The closing of the EGR valve 11 supplies fresh air, instead of the EGR gas, into a combustion chamber of the engine E. Thus, combustion of a larger amount of fuel is possible, thereby maximizing the output of the engine E.

The controller 53 performs Step S30 of determining whether the temperature of the engine coolant is lower than a predetermined reference temperature, when the amount of the operation of the acceleration pedal indicates neither the WOT state nor the rapid acceleration state, and Step S40 of enabling the exhaust heat recovery mode in which all the exhaust gas flowing through the catalytic converter flows through the EGR cooler 7, heating the engine coolant, and in which the heated engine coolant is supplied to the heater 25, in a case where the temperature of the engine coolant is lower than the predetermined reference temperature and where the heater 25 is turned on.

That is, in the exhaust heat recovery mode, in a case where a user turns on the heater 25 when starting the cold-state engine E of the hybrid vehicle, as described above, the controller 53 fully closes the first port 35 and opens the second port 37 with the bypass valve 13, and enables all the exhaust gas to flow through the EGR cooler 7 to heat the engine coolant and then to be discharged. Accordingly, the coolant flowing through the EGR cooler 7 recovers the exhaust heat produced in the engine E, and the recovered exhaust heat contributes greatly to increasing the temperature of the heater 25.

In order to fulfil the purpose as described above, the reference temperature here is determined in the design phase according to results of many experiments and analyses. For example, the reference temperature may be set to 60° C.

The controller 53 performs Step S50 of determining whether or not the temperature of the engine coolant is equal to or higher than the reference temperature, when the amount of the operation of the acceleration pedal indicates neither the WOT state nor the rapid acceleration state, and Step S60 of enabling the EGR mode in which the surplus exhaust gas flowing through the EGR cooler 7 is prevented, by operating the bypass valve 13, from joining to be discharged and in which the degree of opening of the EGR valve 11 is adjusted, in a case where the temperature of the engine coolant is equal to or higher than the reference temperature and where the heater 25 is turned off.

That is, in the EGR mode, the controller 53 enables the valve flap 39 to fully close the second port 37 and to open the first port 35 and thus reduces or minimizes the backpressure exerted on the engine E. Furthermore, the controller 53 adjusts the degree of opening of the EGR valve 11, whenever it is desired to do so for the engine E. Accordingly, the fuel efficiency of the vehicle can be improved with smooth EGR. The EGR mode works effectively when the engine E is under a middle- or high-level load.

The controller 53 performs Step S50 of determining whether or not the temperature of the engine coolant is equal to or higher than the reference temperature, when the amount of the operation of the acceleration pedal indicates neither the WOT state nor the rapid acceleration state, and Step S70 of enabling the complex mode in which the ratio between the amounts of the surplus exhaust gas flowing through the EGR cooler 7 and the exhaust gas bypassing the EGR cooler 7 that join to be discharged is changed with the bypass valve 13 and in which a target temperature of the heater 25 is thus reached, in a case where the temperature of the engine coolant is equal to higher than the reference temperature and where the heater 25 is turned on.

That is, in the complex mode, as illustrated in FIG. 10, when it is determined that a target temperature of the heater 25 is not reached, the bypass valve 13 is counterclockwise rotated by an increment of 1 degree to close the first port 35 in such a manner that a larger amount of the exhaust gas flows through the EGR cooler 7, that is, in such a manner that a larger amount of heat recovered from the exhaust gas is used to heat the heater 25. When the target temperature of the heater 25 is reached, the operation of the bypass valve 13 is interrupted. In this manner, the bypass valve 13 is driven.

At this point, the counterclockwise rotation of the bypass valve 13 means that the first port 35 is closed with the valve flap 39. Conversely, the full clockwise rotation of the bypass valve 13 means that the valve flap 39 fully opens the first port 35 and fully closes the second port 37.

The controller 53 performs Step S50 of determining whether or not the temperature of the engine coolant is equal to or higher than the reference temperature, when the amount of the operation of the acceleration pedal indicates neither the WOT state nor the rapid acceleration state, and Step S80 of enabling the complex mode in which the ratio between the amounts of the surplus exhaust gas flowing through the EGR cooler 7 and the exhaust gas bypassing the EGR cooler 7 that join to be discharged is changed with the bypass valve 13, and in which target EGR is thus achieved, in a case where the temperature of the engine coolant is equal to higher than the reference temperature and where the engine currently operates in the range where EGR is required.

In the complex mode, in a case where, as described above, the engine operates in the range where EGR is required, the valve flap 39 of the bypass valve 13 is rotated in the closing direction (the direction of closing the first port 35) until the target EGR is achieved, in such a manner that the target EGR is achieved as described above, that is, in such a manner that a target amount of EGR gas is introduced into the combustion chamber of the engine E.

The target EGR here means a ratio for recirculation exhaust gas in the engine E, that is, a target ratio between an amount of air introduced into the combustion chamber and an amount of recirculated exhaust gas.

The more the valve flap 39, as described above, is rotated in the direction of closing the first port 35, the more the extent to which a pressure of the exhaust gas flowing through the EGR cooler 7 is higher than a pressure on the engine side increases. Thus, the exhaust gas flows smoothly through the EGR valve 11 and is supplied to the engine E.

Therefore, the bypass valve 13 achieves the same advantage as a differential valve for increasing the range where EGR is required in an engine in the related art.

The hybrid vehicle engine system according to one form of the present disclosure is configured to enable the exhaust gas produced in the engine E to flow separately through the EGR cooler 7 and the bypass pipe 9, and the hybrid vehicle engine system includes: the bypass valve 13 having the valve flap 39 that relatively adjusts the degree of opening of the first port 35 provided to regulate the flow of the exhaust gas through the bypass pipe 9, and the degree of opening of the second port 37 provided to regulate the flow of the exhaust gas through the EGR cooler 7; and the EGR valve 11 through which a portion of the exhaust gas flowing through the EGR cooler 7 is supplied to the engine E. The hybrid vehicle engine system is configured to heat a heater by a coolant from the EGR cooler.

When a high output of the vehicle is desired, the controller 53 enables the high output mode. In the high output mode, the first port 35 is fully opened and the second port 37 is blocked with the valve flap 39 of the bypass valve 13, and the EGR valve 11 is closed, and thus the exhaust gas flows only through the bypass pipe 9.

In addition, when the high output of the vehicle is not required and the temperature of the engine coolant is lower than a predetermined reference temperature, the EGR valve 11 is closed.

The reference temperature here, as described above, is determined in the design phase according to results of many experiments and analyses. For example, the reference temperature may be set to 60° C.

In addition, in a state where the EGR valve 11 is closed according to the desired output of the vehicle and the temperature of the coolant, when the heater 25 of the vehicle is turned on, the exhaust heat recovery mode is enabled in which the first port 35 is fully closed and the second port 37 is fully opened with the valve flap 39 of the bypass valve 13 and in which the exhaust gas is discharged only through the EGR cooler 7.

When the high output of the vehicle is not required, the temperature of the engine coolant is equal to or higher than the reference temperature, and the heater 25 of the vehicle is turned off, the second port 37 is fully closed with the valve flap 39 of the bypass valve 13.

In a state where the second port 37 is fully closed with the valve flap 39 according to the desired output of the vehicle, the temperature of the vehicle coolant, and an operating state of the heater 25 of the vehicle, when the engine E operates in the range where EGR is desired, the EGR mode in which the degree of opening of the EGR valve 11 is adjusted is enabled according to the EGR requirement at that time.

When the high output of the vehicle is not required, the temperate of the engine coolant is equal to or higher than the reference temperature, and the heater 25 of the vehicle is turned on, the complex mode is enabled in which the rotation angle of the valve flap 39 of the bypass valve 13 is adjusted while maintaining a state where the first port 35 and the second port 37 are both opened until the target temperature of the heater 25 is reached.

When the high output of the vehicle is not required, the temperature of the engine coolant is equal to or higher than the reference temperature, and the engine operates in the range where EGR is required, the complex mode is enabled in which the rotation angle of the valve flap 39 of the bypass valve 13 is adjusted while maintaining the state where the first port 35 and the second port 37 are both opened until the target EGR for the engine E is achieved.

When the high output of the vehicle is not required, the temperature of the engine coolant is equal to or higher than the reference temperature, the heater 25 of the vehicle is turned on, and the engine operates in the range where EGR is required, the controller 53 adjusts the valve flap 39 according to whichever of the rotation angle of the valve flap 39 at which the target temperature of the heater 25 is reached and the rotation angle of the valve flap 39 at which the target EGR for the engine E is achieved enables a larger amount of the exhaust gas to flow through the EGR cooler 7.

That is, in the complex mode, in a case where a requirement that the target temperature of the heater 25 of the vehicle has to be reached and a requirement that the target EGR for the engine E has to be achieved are concurrently imposed, the rotation angle of the valve flap 39 of the bypass valve 13 is adjusted according to whichever of the two requirements requires a relatively larger amount of the exhaust gas to bypass the EGR cooler 7.

For example, in a case where the target EGR is already achieved but the target temperature of the heater 25 is not reached, until the target temperature of the heater 25 is reached, the valve flap 39 is rotated in the direction of closing the first port 35 in such a manner that a larger amount of the exhaust gas flows through the EGR cooler 7, exchanging heat with the coolant to be supplied to the heater 25, the EGR valve 11 is rotated relatively much more in the closing direction in such a manner that only a desired amount of the EGR gas is supplied to the engine E.

Conversely, in a case where the target temperature of the heater 25 is reached but the target EGR is not achieved, the valve flap 39 is rotated in the direction of closing the first port 35 in such a manner that a larger amount of the exhaust gas is supplied to the engine E through the EGR cooler 7 and the EGR valve 11 until the target EGR is achieved. The temperature of the heater 25, which is raised to a level higher than a required level, is lowered to satisfy a heating requirement for the air temperature inside the vehicle by lowering a speed of a blower motor, increasing an amount of introduced outside air, or the like.

On the other hand, the controller 53 determines whether or not the high output of the vehicle is required, depending on whether or the amount of the operation of the acceleration pedal is changed to a predetermined level or higher.

The predetermined level here, for example, may be set to 60% or more of the total amount of the operation of the acceleration pedal or in the design phase, may be set to the most suitable value for the vehicle according to results of many experiments and analyses.

Although the specific forms of the present disclosure have been described for illustrative purposes, those skilled in the art will appreciate that various modifications, additions and substitutions are possible, without departing from the scope and spirit of the present disclosure.

What is claimed is:

1. A method of controlling an engine system of a vehicle, where the engine system is configured to enable exhaust gas from an engine to flow separately through an exhaust gas recirculation (EGR) cooler and a bypass pipe, and comprises a bypass valve having a valve flap that relatively adjusts a degree of opening of a first port provided to regulate a flow of the exhaust gas through the bypass pipe, and a degree of opening of a second port provided to regulate a flow of the exhaust gas through the EGR cooler, and an EGR valve through which a portion of the exhaust gas flowing through the EGR cooler is supplied to the engine, the engine system configured to heat a heater by a coolant from the EGR cooler, the method comprising:
    determining, by a controller, whether a high output from the engine is required based on an amount of operation of an acceleration pedal of the vehicle; and
    when the high output is required, controlling, by the controller, the valve flap of the bypass valve to fully open the first port and block the second port, and closing the EGR valve, thereby discharging the exhaust gas only through the bypass pipe.

2. The method of claim 1, wherein, in determining whether the high output is required, when the amount of the operation of the acceleration pedal indicates a wide-open throttle (WOT) state or when the amount of the operation of the acceleration pedal is equal to or greater than a predetermined reference value, it is determined that the high output is required.

3. The method of claim 1, wherein, when the high output of the engine is not required and a temperature of an engine coolant is lower than a predetermined reference temperature, the EGR valve is closed.

4. The method of claim 3, wherein, in a state where the EGR valve is closed, when the heater of the vehicle is turned on, the first port is fully closed and the second port is fully opened by the valve flap of the bypass valve, such that the exhaust gas is discharged only through the EGR cooler.

5. The method of claim 1, wherein, when the high output of the engine is not required, a temperature of an engine coolant is equal to or higher than a predetermined reference temperature, and the heater of the vehicle is turned off, the second port is fully closed by the valve flap of the bypass valve.

6. The method of claim 5, wherein, in a state where the second port is fully closed by the valve flap of the bypass valve, when the engine operates in a range where an EGR is required, the degree of opening of the EGR valve is adjusted based on an EGR requirement at a present time.

7. The method of claim 1, wherein, when the high output of the engine is not required, a temperature of an engine coolant is equal to or higher than a predetermined reference temperature, and the heater of the vehicle is turned on until a target temperature of the heater is reached, a rotation angle of the valve flap of the bypass valve is adjusted while maintaining a state where the first port and the second port are both opened.

8. The method of claim 7, wherein, when the high output of the engine is not required, the temperature of the engine coolant is equal to or higher than the predetermined reference temperature, and the engine operates in a range where an EGR is required until a target EGR for the engine is achieved, the rotation angle of the valve flap of the bypass valve is adjusted while maintaining the state where the first port and the second port are both opened.

9. The method of claim 8, wherein, when the high output of the engine is not required, the temperature of the engine coolant is equal to or higher than the predetermined reference temperature, the heater of the vehicle is turned on, and the engine operates in the range where the EGR is required, comparing, by the controller, a first rotation angle of the valve flap at which the target temperature of the heater is reached with a second rotation angle of the valve flap at which the target EGR for the engine is achieved;
    determining, by the controller, which rotation angle of the valve flap, among the first and second rotation angles of the valve flap, allows a larger amount of the exhaust gas to flow through the EGR cooler; and
    adjusting, by the controller, the valve flap with the determined rotation angle of the valve flap, among the first and second rotation angles of the valve flap.

* * * * *